(No Model.)
E. DEVONSHIRE.
WATER PURIFIER.
No. 462,537. Patented Nov. 3, 1891.
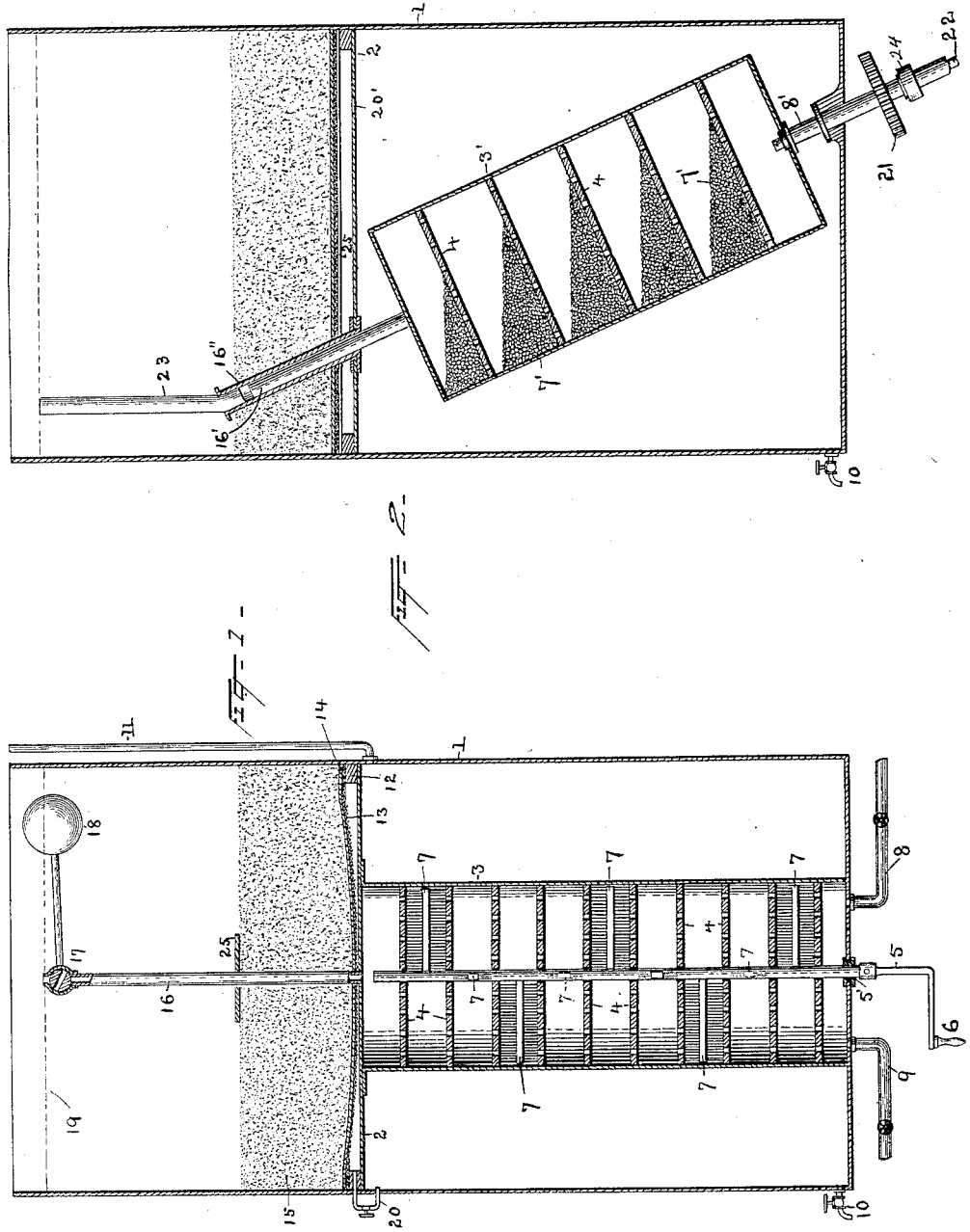
Witnesses
Norris A. Clark,
N. F. Oberle
Inventor
E. Devonshire
By his Attorneys
Dyer & Seely

UNITED STATES PATENT OFFICE.

EASTON DEVONSHIRE, OF LONDON, ENGLAND, ASSIGNOR TO THE REVOLVING PURIFIER COMPANY, LIMITED, OF SAME PLACE.

WATER-PURIFIER.

SPECIFICATION forming part of Letters Patent No. 462,537, dated November 3, 1891.

Application filed February 27, 1891. Serial No. 383,071. (No model.)

*To all whom it may concern:*

Be it known that I, EASTON DEVONSHIRE, a subject of the Queen of Great Britain, residing at London, county of Middlesex, England, (Case F,) have invented a certain new and useful Improvement in Water-Purifiers, of which the following is a specification.

The present invention relates to apparatus for purifying water by treating it with metallic iron or similar chemically-acting purifying material and then filtering the water.

The object of the invention is to provide improved apparatus especially adapted for the purpose mentioned in places where a comparatively small quantity of water is needed—for example, in private dwelling-houses—although the invention to be described is not limited in its application to such small apparatus.

In the accompanying drawings, illustrating the improvement, Figure 1 is a central section through one form of my apparatus, and Fig. 2 is a similar view of a modification.

1 is a tank or vessel of any suitable material, divided by a partition 2 into two compartments. Within the lower compartment is a chamber or cylinder 3, preferably of galvanized iron, containing iron for acting chemically on impurities in the water. This chamber is entirely inclosed, except at the water inlet and outlet passages, so that it has no direct communication with the space around it, but is connected therewith indirectly through the filter. The iron is preferably in the form of perforated plates, open-work partitions, or grids 4.

In the form illustrated in Fig. 1 a shaft 5, having a crank-handle 6, extends centrally through the cylinder 3, through central holes in the several grids, and through a water-tight gland or packing 5'. Carried by the shaft are brushes 7, adapted, when they are moved by means of the handle 6, to polish the grids. The several brushes are preferably arranged spirally on the shaft, and the brushes are so formed that they rub against both the plate below and the plate above.

8 is a water-inlet, preferably at the bottom of the purifier. It is not necessary that this inlet should pass through the bottom of the tank, as shown.

9 is a pipe which may be used, when it is necessary to flush the purifier, to remove rust which collects in the bottom.

10 is a cock by means of which water may be drawn from the pure-water reservoir—that is, from the space in the tank around the purifier.

11 is a pipe leading from the top of the purified-water reservoir and serves as an air-pipe to admit air above the water in the tank.

Immediately above the partition 2 is a ring 12, on which is a copper or other wire-gauze 13, and above and resting on the gauze is a strainer 14 of asbestus, cloth, or similar material.

In Fig. 1 the gauze and strainer, being unsupported at the center, sag down and rest on the partition. Above the cloth is a layer of sand 15. 16 is a pipe or any suitable passage which extends from the top of the purifier up through the sand filter to the water-line 19 of the tank. This pipe has near its end a valve 17, the position of which is controlled by a float 18, which rests in the water. 20 is a pipe or passage-way containing a regulating-valve and leading from the space above the partition 2 to the space below said partition. By turning said valve to permit a more or less rapid flow of water the length of time which the water is retained in the purifier can be controlled. It is evident that instead of the passage 20 one or more small holes might be made in the partition, so that the water could pass directly through. This is indicated in Fig. 2 at 20'.

In Fig. 2 the purifier 3' is shown inclined instead of vertical, as in Fig. 1. This purifier has grids or partitions 4; but the polishing material or means is in the form of solid particles 7', such as coarse gravel or iron scraps. 8' is the water-inlet pipe extending through the bottom of the tank and serving also as a journal for the purifier. A similar journal-pipe 16' passes through a long bearing 16" at the top and serves as a water-outlet. 23 is a stationary section of pipe extending from the bearing 16" to the water-line. The automatic valve is not shown in this figure, although it would ordinarily be used. Either above or below the tank are means for turning the purifier. This is indicated by the gear-wheel 21. 24 is a box in which pipe 8' terminates and in which it can turn. The arrangement of the strainer and filter above the partition 2 is the same as already described, except that cross-bars 25 or a perforated plate are used to support the strainer and filter. 22 is an air-pipe by means of which air may be introduced to the purifier to aerate the water while it is being treated with iron, as set forth in a patent to Mr. William Anderson, No. 444,772, dated January 13, 1891.

With either form of apparatus the water passes upward through the purifier, (the term "purifier" being used to describe the apparatus in the bottom of the tank in which the water is brought into contact with the metallic iron or similar material for the purpose of oxidizing or chemically changing the impurities in the water,) overflows the top of pipe 16, falls onto plate 25, and then flows onto the sand filter, percolating through the same to the space below the filter, thence through the passage 20 or 20' to the pure-water tank. When the water rises above the filter to the level shown in Fig. 1, the float rises and turns the valve to close it, as shown. As the water-level falls the float descends and again opens the valve. In this way the supply is always maintained and all danger of overflow is avoided.

Having thus described the invention, what I claim is—

1. The combination of a tank or vessel divided by a partition into upper and lower compartments, the lower compartment forming a reservoir for the purified water, a filter in the upper compartment, a purifier containing iron as the chemical agent, and a pipe leading from the purifier to the filter, substantially as described.

2. The combination of a tank, a purifier containing active materials, as iron, in the lower part of the tank, a water-reservoir around the purifier, and a filter in the tank above the purifier, substantially as described.

3. The combination of a tank, a partition dividing the same, a purifier below the partition and partially filling the space, a filter above the partition, and means for passing water through the purifier, then through the filter, and then to the space in the tank around the filter, substantially as described.

4. The combination of a water-tank, a purifier in the tank containing iron as a purifying material, and means for polishing the iron, the purifier-chamber being entirely inclosed, except at the inlet and outlet passages, whereby there is no direct communication between the tank and purifier, substantially as described.

5. The combination of a water-tank, a purifier in the tank, said purifier being entirely inclosed, except at the inlet and outlet passages, and containing iron, perforated partitions or grids, and polishers for the grids, substantially as described.

6. The combination of a purifier containing iron as a purifying material, a filter above the purifier, an inlet for the purifier, and a pipe leading from the purifier to the top of the filter, substantially as described.

7. The combination of an upright purifier containing iron as a purifying material, a filter above the purifier, a water-inlet at the bottom of the purifier, and a pipe leading from the purifier to the top of the filter, substantially as described.

8. The combination of a tank adapted to hold water, an upright purifier containing iron purifying material within the tank, and a pipe communicating with the bottom of the purifier, substantially as described.

9. The combination of a tank, a purifier, a filter adjacent to the purifier, a pipe extending from the purifier to the filter, and a valve controlled by a float for opening and closing said pipe, substantially as described.

10. The combination of a tank, a purifier in the tank, a filter above the purifier, and a partition between the filter and purifier, there being a passage from the space above the partition to the space in the tank around the purifier, substantially as described.

This specification signed and witnessed this 23d day of February, 1891.

EASTON DEVONSHIRE.

Witnesses:
WILBER J. ANDREWS,
NINA F. KREBAUM.